United States Patent [19]
Rentschler et al.

[11] Patent Number: 5,940,086
[45] Date of Patent: Aug. 17, 1999

[54] SYSTEM AND METHOD FOR DYNAMICALLY ALLOCATING DATA AMONG GEOMETRY ACCELERATORS IN A COMPUTER GRAPHICS SYSTEM

[75] Inventors: Eric Rentschler, Ft Collins; Alan S. Krech, Jr.; Noel D. Scott, both of Fort Collins, all of Colo.

[73] Assignee: Hewlett Packard Company, Palo Alto, Calif.

[21] Appl. No.: 08/781,671

[22] Filed: Jan. 10, 1997

[51] Int. Cl.⁶ .................................................. G06F 15/16
[52] U.S. Cl. ...................... 345/503; 345/506; 345/508; 395/675
[58] Field of Search .................... 345/502, 503, 345/505, 506, 507, 508, 509; 395/675

[56] References Cited

U.S. PATENT DOCUMENTS

| 5,394,524 | 2/1995 | DiNicola et al. | 345/506 |
| 5,467,459 | 11/1995 | Alexander et al. | 345/514 |

OTHER PUBLICATIONS

"Dynamic load balancing in a distributed computer system", K. Erciyes et al, MELECON '91: Mediterranean Electrotechnical Conference, pp. 1077–1080, 1991.

*Primary Examiner*—Kee M. Tung

[57] ABSTRACT

A system and associated method for dynamically allocating vertex data to a plurality of geometry accelerators in a computer graphics system based upon the relative current capability of the geometry accelerators to process the data. This efficient distribution of vertex data substantially reduces the amount of time individual geometry accelerators remain idle, thereby increasing both the efficiency of each geometry accelerator as well as the overall parallel processing of vertex data. This selective utilization of geometry accelerators thereby results in a significant increase in the throughput performance of the computer graphics system. A computer graphics system in accordance with the present invention comprises a plurality of geometry accelerators and a distributor connected through two unidirectional buses that transmit data in opposite directions. The geometry accelerators are connected, through appropriate interfacing hardware, directly to an input bus. The geometry accelerators are also coupled to an output bus in a manner that enables them to control the flow of data generated by upstream geometry accelerators. This dual bus arrangement enables the distributor to control the allocation of vertex data while enabling the geometry accelerators to control the subsequent combining of resulting rendering data.

34 Claims, 6 Drawing Sheets

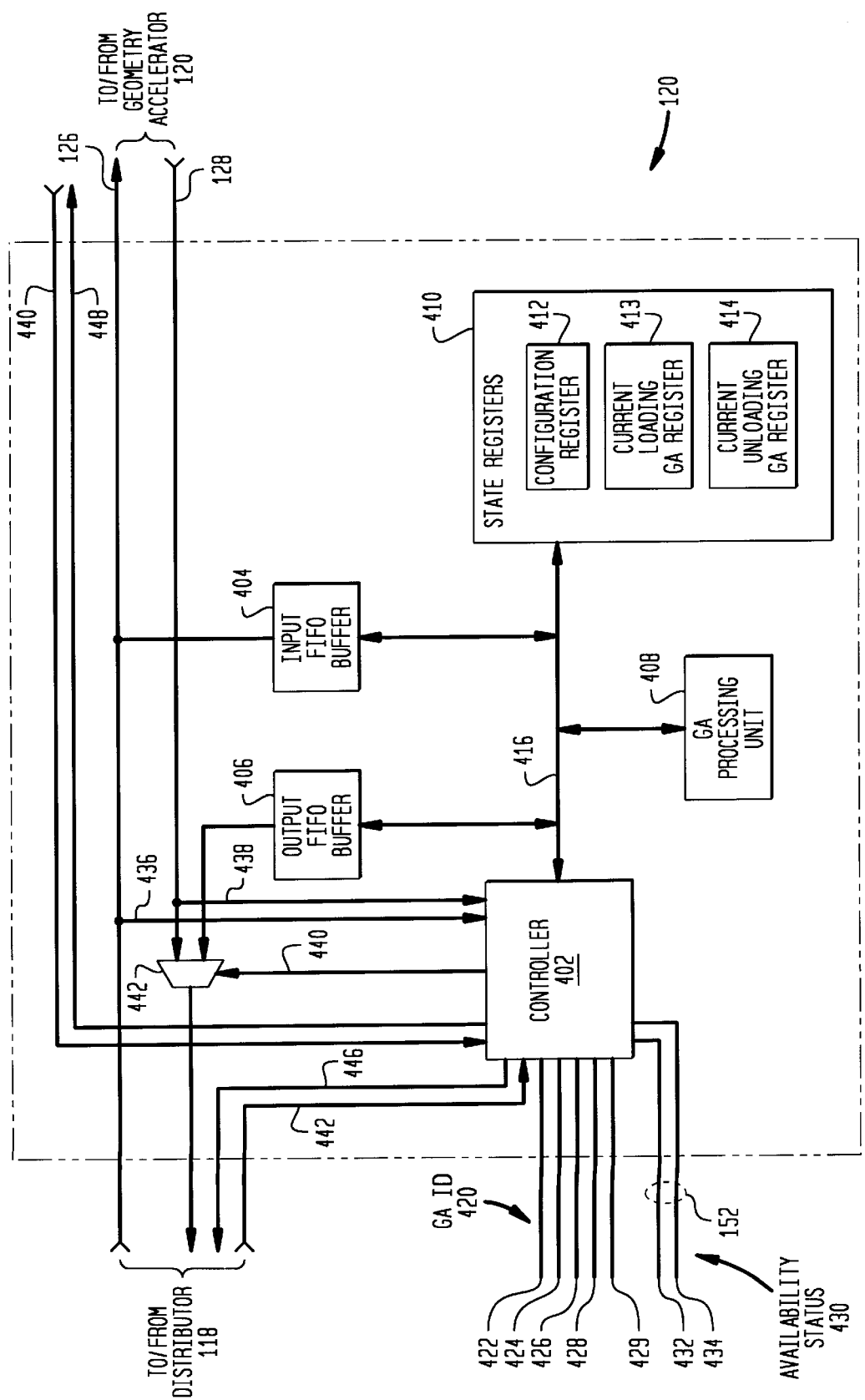

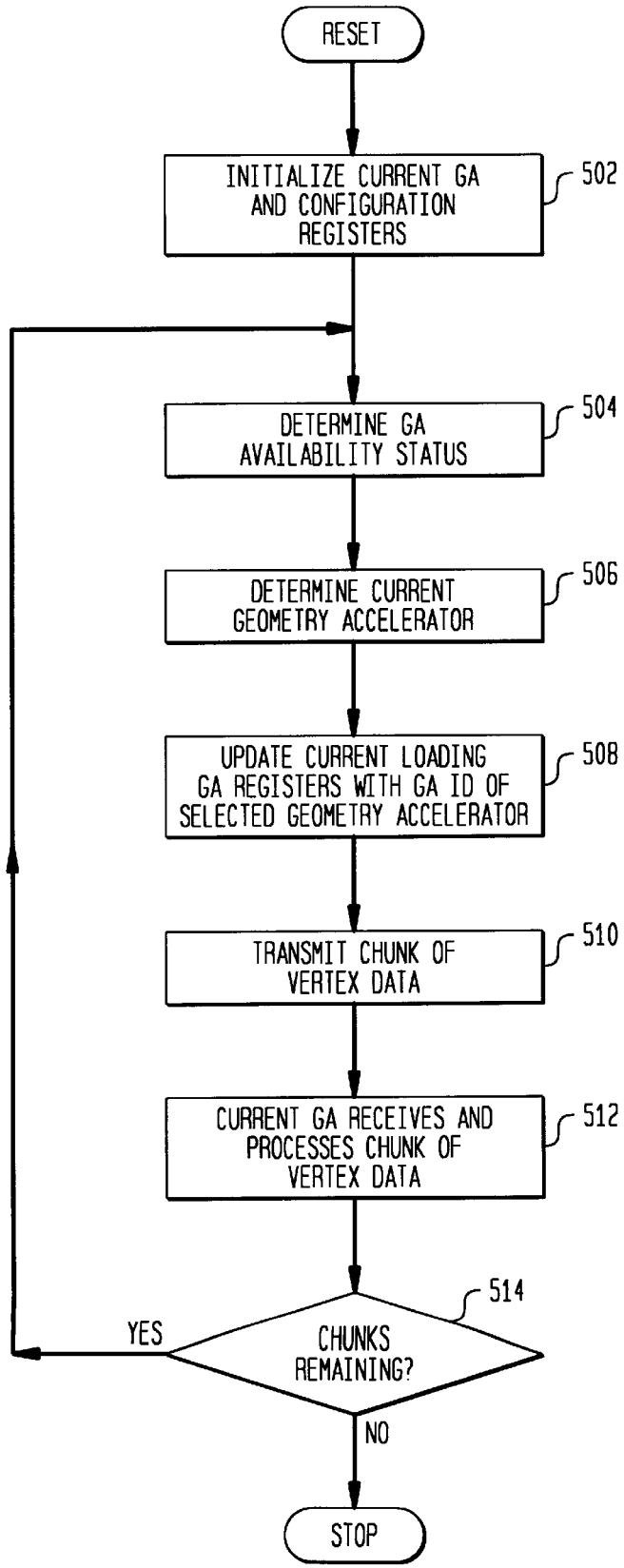

SYSTEM AND METHOD FOR DYNAMICALLY ALLOCATING DATA AMONG GEOMETRY ACCELERATORS IN A COMPUTER GRAPHICS SYSTEM

BACKGROUND OF THE INVENTION

1. Field of the Invention

The present invention relates generally to computer graphics systems and, more particularly, to a computer graphics system utilizing parallel processing of vertex data to achieve enhanced performance.

2. Related Art

Computer graphics systems are commonly used for displaying graphical representations of objects on a two-dimensional video display screen. Current computer graphics systems provide highly detailed representations and are used in a variety of applications.

In typical computer graphics systems, an object to be represented on the display screen is broken down into graphics primitives. Primitives are basic components of a graphics display and may include points, lines, vectors, and polygons such as triangles and quadrilaterals. Typically, a hardware/software scheme is implemented to render, or draw, the graphics primitives that represent a view of one or more objects being represented on the display screen. Generally, the primitives of the three-dimensional object to be rendered are defined by a host computer in terms of primitive data. For example, when the primitive is a triangle, the host computer may define the primitive in terms of the X, Y and Z coordinates of its vertices, as well as the red, green and blue (R, G and B) color values of each vertex. Additional primitive data may be used in specific applications. Rendering hardware interpolates the primitive data to compute the display screen pixels that represent each primitive, and the R, G and B color values for each pixel.

The basic components of a computer graphics system typically include a geometry accelerator, a rasterizer and a frame buffer. The system may also include other hardware such as texture mapping hardware. The geometry accelerator (GA) receives vertex data from the host computer that defines the primitives that make up the view to be displayed. The geometry accelerator performs transformations on the vertex data, decomposes quadrilaterals into triangles and performs lighting, clipping and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware, if available, are combined and stored in the frame buffer for display on the video display screen.

The operations of the geometry accelerator are highly computation intensive. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. The data for a single quadrilateral may be on the order of 64 words of 32 bits each. Additional data transmitted from the host computer to the geometry accelerator includes lighting parameters, clipping parameters and any other parameters needed to generate the graphics display.

Various techniques have been employed to improve the performance of geometry accelerators, including pipelining and parallel processing. However, conventional graphic systems distribute the vertex data to the geometry accelerators in a manner that results in a non-uniform loading of the geometry accelerators. This variability in geometry accelerator utilization results in periods of time when one or more geometry accelerators are not processing vertex data when they are capable of doing so. Since the throughput of the graphics system is dependent upon the efficiency of the geometry accelerators, this inefficient use of the geometry accelerators' processing capabilities decreases the efficiency of the graphics system.

One conventional approach for distributing "chunks" of data to a parallel arrangement of geometry accelerators is described in U.S. patent application Ser. No. 08/634,458 entitled "Computer Graphics System Utilizing Parallel Processing For Enhanced Performance" to Shah et al., filed on Apr. 18, 1996, and owned by the assignee of the present application. With this technique, referred to as round-robin, hardware upstream of the geometry accelerators sends chunks of data to each of the geometry accelerators in a predetermined sequential order. This distribution sequence is repeated indefinitely until all of the vertex data has been processed. The hardware downstream of the geometry accelerators receives and combines the separate chunks of rendering data using the same predetermined sequence. That is, the geometry accelerators produce chunks of rendering data that are later combined to form a stream of rendering data representing a sequence of graphics primitives that is in the same order as the stream of graphics primitives represented by the stream of vertex data.

A drawback to this approach is that it does not take into consideration the fact that the geometry accelerators do not process all vertex data at the same rate. That is, certain types of vertex data require a greater time to be processed than others. If a geometry accelerator receives a chunk of vertex data that takes a substantial amount of time to process, the other geometry accelerators may become idle for a considerable period of time while the graphics system waits for that particular geometry accelerator to complete processing. Conversely, if a geometry accelerator receives a chunk of vertex data that takes a very short period of time to process, that geometry accelerator may complete its processing and become idle while it waits for the other geometry accelerators to complete the processing of their respective chunks of data. This variable processing time, coupled with the requirement that the chunks of rendering data must be combined in the same sequence as the corresponding chunks of vertex data, results in periods of time during which the geometry accelerators are not operating on vertex data. This inefficient utilization of the processing capabilities of the geometry accelerators adversely affects the efficiency of the graphics system.

This problem is exacerbated by an increase in the number of geometry accelerators in the graphics system. This is because the periodic interval at which all geometry accelerators receive vertex data increases with each additional geometry accelerator due to the sequential, round-robin approach described above. Thus, as the graphics system architecture is expanded to achieve greater processing capabilities, the efficiency of the resulting system is reduced.

It is therefore a principal objective of the present invention to provide a computer graphics system capable of efficiently distributing data to a plurality of geometry accelerators. Such a graphics system may then achieve improved throughput performance by reducing the inefficiencies associated with the parallel processing of vertex data.

SUMMARY OF THE INVENTION

The present invention comprises a system and associated method for dynamically allocating vertex data to a plurality of geometry accelerators in a computer graphics system based upon a relative current capability of the geometry accelerators to process the data. This efficient distribution of vertex data substantially reduces the amount of time individual geometry accelerators remain idle, thereby increasing both the efficiency of each geometry accelerator as well as the overall parallel processing of vertex data. This selective utilization of geometry accelerators thereby results in a significant increase in the throughput performance of the computer graphics system.

A computer graphics system in accordance with the present invention comprises a plurality of geometry accelerators and a distributor all of which are connected through two unidirectional buses that transmit data in opposite directions. The geometry accelerators are connected directly to an input bus through appropriate interfacing hardware. A transmission from the distributor propagates the length of the input bus and is made available to all of the geometry accelerators. The geometry accelerators are also coupled to an output bus in a manner that enables them to control the flow of data generated by upstream geometry accelerators. This dual bus arrangement enables the distributor to control the allocation of vertex data while enabling the geometry accelerators to control the subsequent combining of the resulting rendering data.

The geometry accelerators generate rendering data resulting from the processing of vertex data representative of graphics primitives. In accordance with the present invention, the distributor is responsive to a stream of vertex data and, based upon availability status information provided by the geometry accelerators, allocates chunks of vertex data to specific geometry accelerators for processing. The geometry accelerators generate corresponding chunks of rendering data, outputting them onto the output bus in the same sequence that the corresponding chunks of vertex data were distributed. As a result, the stream of rendering data and the stream of vertex data represent sequences of graphics primitives having the same order.

Specifically, each geometry accelerator includes an input first-in-first-out (FIFO) buffer, an output FIFO buffer and a processing unit for performing geometry accelerator functions, all of which are responsive to a controller within the geometry accelerator. A geometry accelerator availability status is generated by the controller based upon characteristics indicative of the geometry accelerator's ability to receive, process, and output data. Preferably, the geometry accelerator controller considers such factors as the amount of vertex data in the input FIFO, the amount of rendering data in the output FIFO and whether vertex data is currently being processed by the processing unit. It is also desirable to have multiple degrees or levels of availability to provide greater insight into each geometry accelerator's processing capability.

In one embodiment, there are four availability status levels each representing a successively greater capability to process vertex data. A Completely Available status indicates that the geometry accelerator is capable of immediately processing vertex data. A geometry accelerator may be considered to be completely available when the geometry accelerator has no data in its input and output FIFOs and is not currently processing any vertex data. A Substantially Available status indicates that there may be a momentary wait before the geometry accelerator will be capable of processing new vertex data. A geometry accelerator may be considered to be substantially available when the geometry accelerator has no data in its input FIFO, is not currently processing vertex data, but has data in its output FIFO. A Partially Available status indicates that there will be a moderate wait before the geometry accelerator will be capable of processing vertex data. A geometry accelerator may be considered to be partially available when the geometry accelerator has no data in its input FIFO and is currently processing vertex data. An Unavailable status indicates that there will be a significant wait before the geometry accelerator will be capable of processing vertex data. A geometry accelerator may be considered to be unavailable when the geometry accelerator has an input FIFO that is at least partially full and the geometry accelerator is currently processing vertex data.

The distributor and geometry accelerators each include a system configuration register for defining the number of geometry accelerators in the graphics system, and a current loading geometry accelerator register for defining which geometry accelerator is currently designated to receive a chunk of vertex data. At system reset, the current loading geometry accelerator registers are initialized with the same geometry accelerator ID value so that all communicating devices know which geometry accelerator is to receive the first chunk of vertex data. Afterwards, the distributor determines the current geometry accelerator for each chunk of vertex data based upon the relative availability of all of the geometry accelerators, which is provided to the distributor by the geometry accelerators.

The distributor uses the transmission of GA control words to communicate to the geometry accelerators which geometry accelerator has been determined to receive a chunk of vertex data. When each geometry accelerator senses a GA control word on the input bus, it increments the GA ID value in its current loading GA register. Thus, by generating the appropriate number of GA control words, the distributor causes the value in the current GA register in all of the geometry accelerators to be incremented until the desired geometry accelerator's ID value is reached.

Each of the GA control words is received by a successive geometry accelerator while the selected current geometry accelerator receives the chunk of vertex data with the GA control word. In other words, the distributor transmits no vertex data with the GA control word to geometry accelerators that are determined to be too busy to process data, advancing past these geometry accelerators until the most available geometry accelerator is reached. In this manner, the present invention selectively allocates vertex data among geometry accelerators using a minimal amount of hardware and a simple control protocol.

The same simplicity and efficiency are provided by the present invention to combine the resulting chunks of rendering data into a stream of rendering data that preserves the original relative order of the chunks as supplied to the geometry accelerators. Initially, the geometry accelerators place the chunks of rendering data into an associated output FIFO buffer with the GA control word that the geometry accelerator received with the associated chunk of vertex data. Each output FIFO buffer is coupled to the output bus through a geometry accelerator-controlled multiplexer that enables the geometry accelerator to forward to the distributor either rendering data provided by upstream geometry accelerators or rendering data in its own output buffer.

The controller of the geometry accelerator determines when to output the data in the output FIFO onto the output bus such that the original order is restored. When a geometry accelerator forwards a chunk of rendering data to the distributor, it also forwards the associated GA control word. The geometry accelerator controllers monitor the output bus, counting the GA control words released by upstream geometry accelerators to determine when to interrupt the flow of data from the upstream geometry accelerators and output its rendering data onto the output bus. Thus, the geometry accelerators combine the chunks of rendering data into a stream of rendering data representing a sequence of graphics primitives that is the same as that represented by the stream of vertex data using a minimal amount of hardware and a simple control protocol. The resulting stream of rendering data is then provided to the frame buffer subsystem.

Advantageously, the present invention maintains this improved efficiency as the number of geometry accelerators implemented in the graphics system increases. As a result, the graphics system may incorporate various quantities of geometry accelerators to meet various performance requirements in a cost-efficient manner.

Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numerals identifies the drawing in which the reference numerals first appears.

BRIEF DESCRIPTION OF THE DRAWINGS

This invention is pointed out with particularity in the appended claims. The above and further advantages of this invention may be better understood by referring to the following detailed description when taken in conjunction with the accompanying drawings, in which:

FIG. 4 is a block diagram of an embodiment of a geometry accelerator of the present invention shown in FIG. 1;

FIG. 5A is a flow chart of the functions performed by the distributor and geometric accelerators during the allocation of chunks of vertex data.

DETAILED DESCRIPTION

Figure 1:
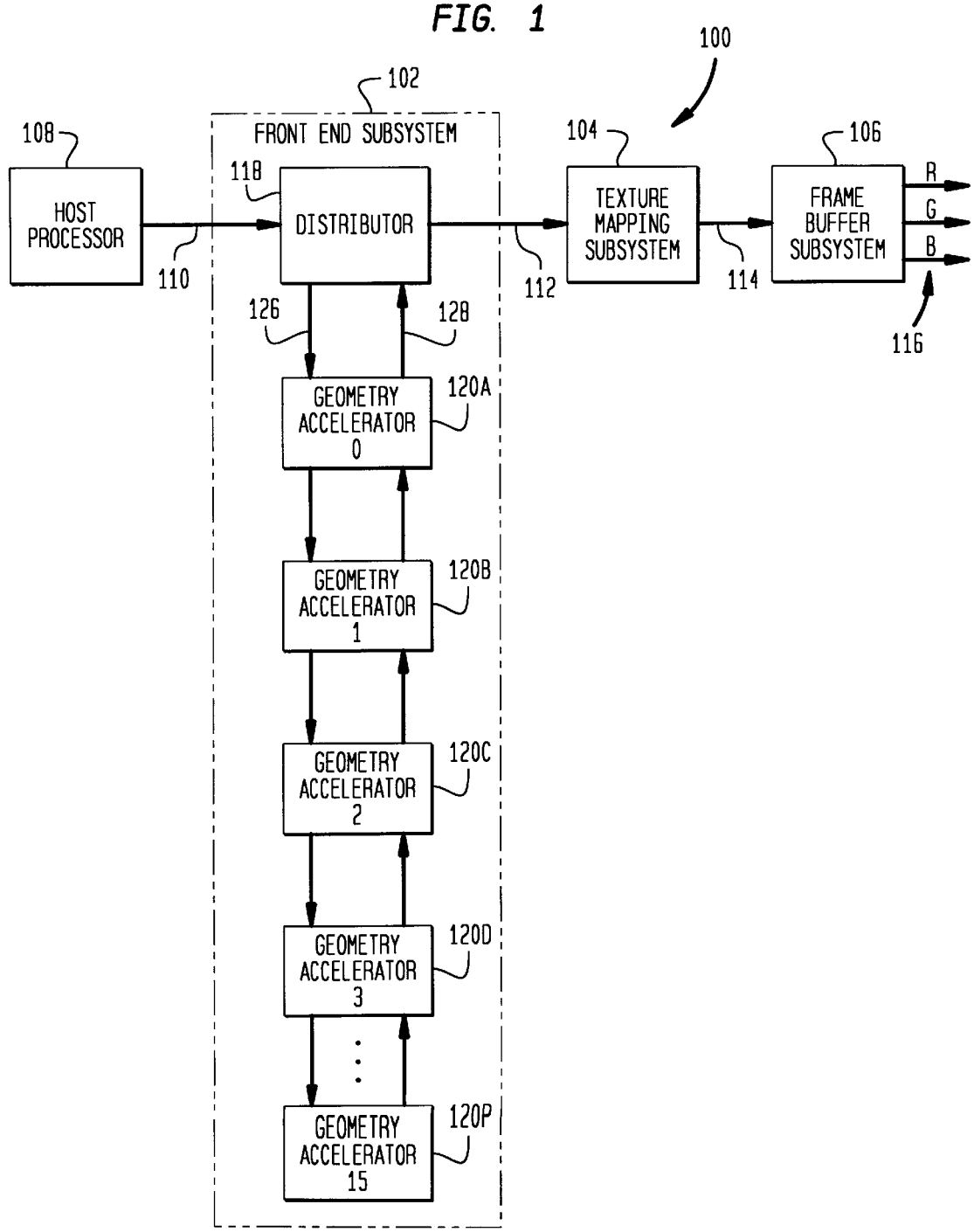
FIG. 1 is a block diagram of an exemplary computer graphics system incorporating the distributor and geometry accelerators of the present invention.

FIG. 1 is a block diagram of an exemplary computer graphics system 100 suitable for incorporation of the distributor and geometry accelerators of the present invention. As shown, the system 100 includes a front end subsystem 102, a texture mapping subsystem 104 and a frame buffer frame subsystem 106. The front end subsystem 102 receives primitives to be rendered from the host computer 108 over bus 110. The primitives are typically specified by X, Y and Z coordinate data, and R, G and B color data, alpha, normals and texture S, T, R, Q coordinates for portions of the primitives, such as the vertices.

Data representing the primitives in three dimensions is provided by the front end subsystem 102 to the frame buffer subsystem 106 over bus 112 to an optional texture mapping subsystem 104. The texture mapping subsystem 104 interpolates the received primitive data to compute the screen display pixels that will represent the primitive, and determines corresponding resultant texture data for each primitive pixel. The resultant texture data is provided to the frame buffer subsystem 106 over one or more buses 114.

The frame buffer subsystem 106 interpolates the primitive data received from the front end subsystem 102 to compute the pixels on the display screen that will represent each primitive, and to determine object color values and Z values for each pixel. The frame buffer subsystem 106 combines, on a pixel-by-pixel basis, the object color values with the resultant texture data provided from the optional texture mapping subsystem 104, to generate resulting image R, G, B values for each pixel. R, G, B color control signals for each pixel are respectively provided over R, G, B lines 116 to control the pixels of the display screen (not shown) to display a resulting image on the display screen that represents the texture-mapped primitive.

In accordance with the present invention, the front end subsystem 102 includes a distributor 118 and a plurality of three-dimensional (3-D) geometry accelerators 120A–120P (collectively and generally referred to as geometry accelerators 120). As noted, the distributor 118 receives the X, Y, Z coordinates and color primitive data over bus 110 from the host computer 108. The distributor 118 dynamically allocates the primitive data among the geometry accelerators 120 in accordance with the present invention as described below.

Vertex data is provided over bus 126 to the geometry accelerators 120. Each geometry accelerator 120 performs well known geometry accelerator functions resulting in rendering data for display. Output data from the geometry accelerators 120 is provided over output bus 128 to distributor 118 in accordance with the present invention. Distributor 118 reformats the primitive output data (i.e., rendering data) received from the geometry accelerators 120, performs a floating point to fixed point conversion, and provides the primitive data stream over bus 112 to optional texture-mapping subsystem 104 and, subsequently, to frame buffer subsystem 106.

The texture mapping subsystem 104 and frame buffer subsystem 106 may be any well-known systems now or later developed. Furthermore, the front end subsystem 102, texture-mapping subsystem 104 and frame buffer subsystem 106 each is preferably pipelined and operates on multiple primitives simultaneously. While the texture-mapping subsystem 104 and the frame buffer subsystem 106 operate on primitives previously provided by the front end subsystem 102, the front end subsystem 102 continues to operate and provides new primitives until the pipelines in the subsystems 104 and 106 become full.

Figure 2:
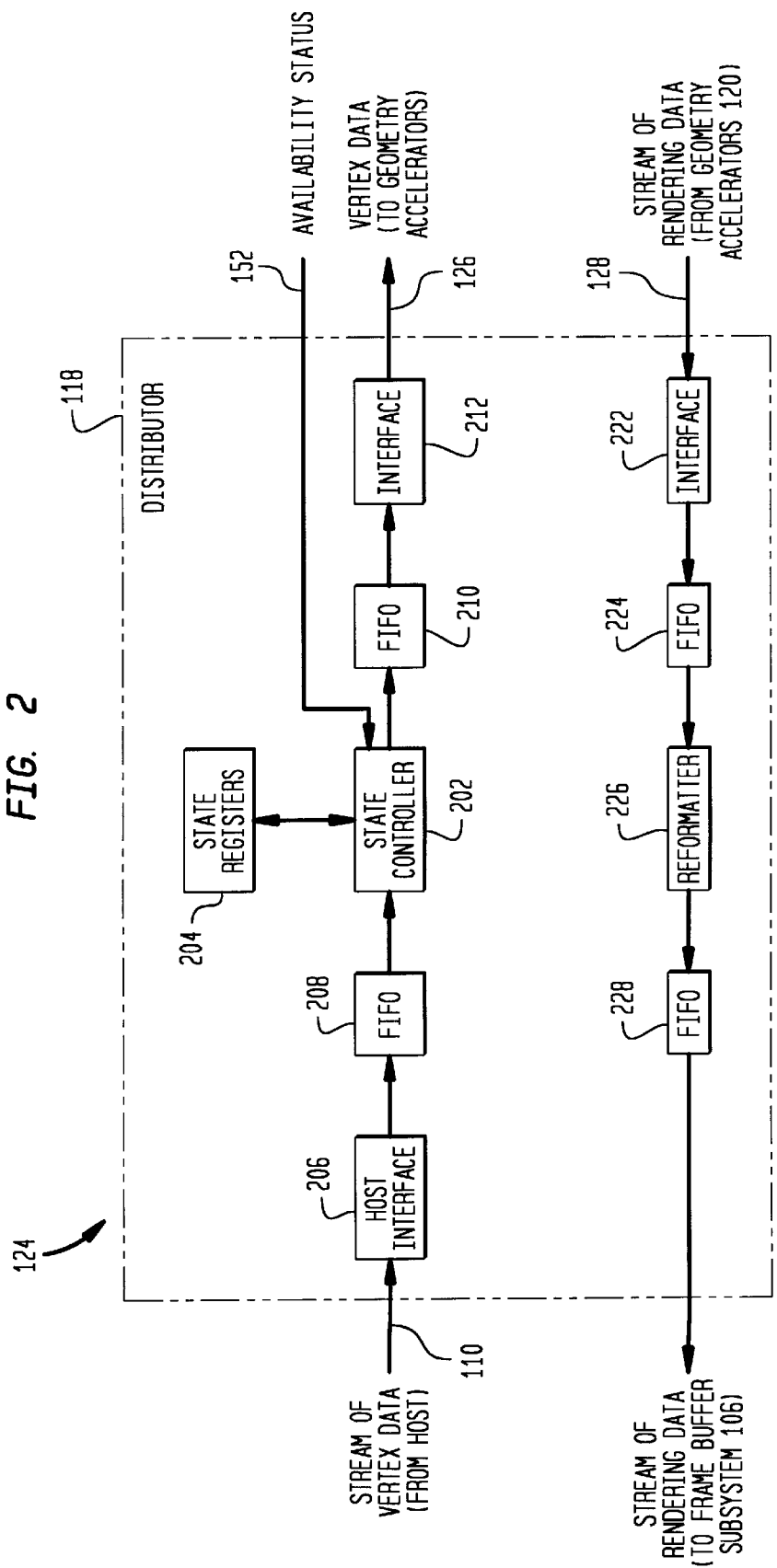
FIG. 2 is a block diagram of an embodiment of the distributor of the present invention shown in FIG. 1.
Figure 3:
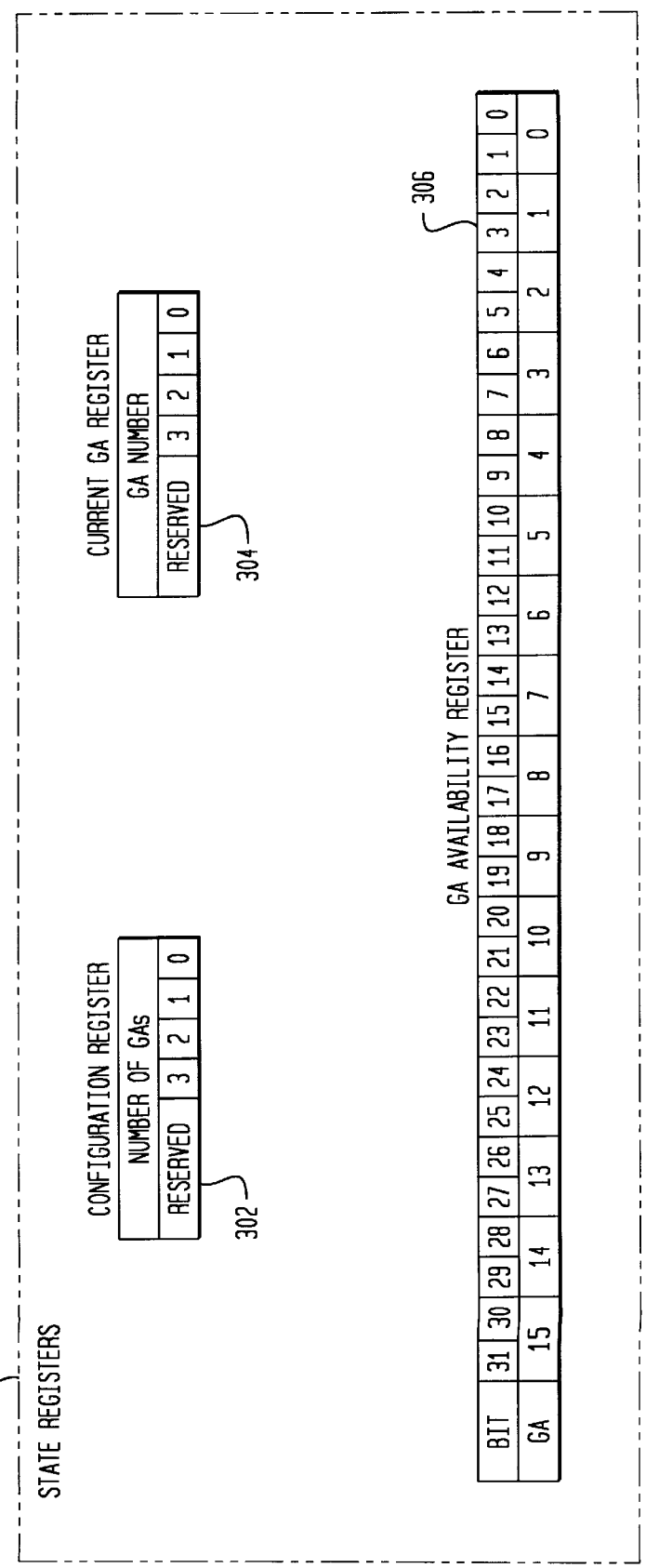
FIG. 3 is a schematic block diagram of the distributor state registers of the present invention.

The dynamic allocation of vertex data to the plurality of geometry accelerators 120 in accordance with the present invention is described below with reference to FIGS. 2–4. FIG. 2 is a block diagram of the distributor 118. FIG. 3 is a schematic block diagram of the state registers utilized by the distributor 118. FIG. 4 is a block diagram of a geometry accelerator 120 configured in accordance with the present invention.

Distributor 118 receives a stream of vertex data representative of graphics primitives from the host computer 108 over bus 110 and distributes this vertex data to the geometry accelerators 120 via the input bus 126 in accordance with the present invention. Since the geometry accelerators 120 may process data in parallel, it is necessary to establish a method for dividing the work of processing the vertex data among all the geometry accelerators 120. In accordance with the present invention, the distributor 118 divides the vertex data into chunks. A chunk is defined a number of primitives that are allocated to a specific geometry accelerator before the distributor 118 advances to another geometry accelerator to achieve a desired parallelization. In accordance with the present invention, distributor 118 performs what is referred to as dynamic chunk allocation. That is, distributor 118 dynamically determines which geometry accelerator 120 is to receive a chunk of primitives based upon a relative capability of the geometry accelerators to process the data.

The output of each geometry accelerator 120 is rendering data corresponding to the primitives represented by the chunks of vertex data supplied to that geometry accelerator. The geometry accelerators output the resulting chunks of rendering data onto bus 128 in such a manner to insure that they are combined into a stream of rendering data that preserves the original relative order of the chunks as supplied to the geometry accelerators. The distributor 118 receives the chunks of rendering data from the geometry accelerators and forwards the stream of rendering data on bus 112 to frame buffer subsystem 106 and texture mapping subsystem 104 (if present).

Preferably, the input bus 126 is a 32-bit bus and the vertex data is provided over the input bus to the geometry accelerators 120 at a rate of 200 MHz. The output bus 128 is preferably a 44-bit bus, with the geometry accelerators 120 providing data over the output bus to distributor 118 at a rate of 200 MHz. It should be also understood that the illustrative implementation shown is merely exemplary with respect to the bus widths and the data transfer rates. It will be understood that different bus configurations may be utilized within the scope of the present invention, depending upon the relative operating speeds of the geometry accelerators 120 and the input and output buses 126 and 128. The principal requirement, however, is that the input bus 126 is capable of supplying vertex data to each of the geometry accelerators at sufficient speed to insure that the geometry accelerators 120 are not idle due to lack of otherwise-available vertex data. In addition, the output bus 128 must have sufficient capacity and operating speed to carry the rendering data to the distributor 118. This is to insure that the output buffer of each geometry accelerator does not remain full for a significant period of time, which would cause the geometry accelerator to become idle while it waits for its output buffer to be emptied.

A block diagram of the distributor 118 of the present invention is shown in FIG. 2. The distributor 118 includes a state controller 202 and state registers 204 which are configured to perform the dynamic chunk allocation method of the present invention. A host interface 206 decodes read/write transactions on the host bus 110 and sends the transactions to a buffer 208. State registers 204 contain graphics system information pertinent to the present invention as described below with reference to FIG. 3. Input buffer 208 is preferably a FIFO that buffers all data supplied to the graphics system 100. An output buffer 210 receives chunks of vertex data from state controller 202. Output buffer 210 is also preferably a FIFO. An interface block 212 provides the chunks of vertex data to the geometry accelerators 120 over bus 126.

A schematic block diagram of the state registers 204 utilized by the state controller 202 to perform the dynamic chunk allocation method of the present invention is shown in FIG. 3. Included in state registers 204 is a system configuration status register 302 that contains information pertaining to the configuration of the geometry accelerators 120. In particular, a 4-bit field in the configuration status register 302 indicates the number of geometry accelerators 120 that are installed in the graphics system 100. In one preferred embodiment, the computer graphics system 100 includes sixteen geometry accelerators, although it is understood that the system 100 may include any number of geometry accelerators. In this embodiment, only a 4-bit field is required to identify the number of geometry accelerators in the system. Status registers 204 also include a current geometry accelerator register 304 that contains a geometry accelerator identification (GA ID) of the geometry accelerator 120 which is presently receiving a chunk of vertex data from the distributor 118. As will be described in detail below, each of the geometry accelerators 120 is assigned a unique geometry accelerator identification number (GA ID) which uniquely identifies the geometry accelerator in the system 100.

As noted, the geometry accelerators 120 provide their availability status to the distributor 118 indicating the geometry accelerators' current capability to process vertex data. The status registers 204 also include a geometry accelerator availability (GA availability) register 306 to store this information. The availability status may identify any number of degrees or levels of availability. As will be discussed below, in one preferred embodiment, four availability levels are used to represent the processing capability of the geometry accelerators. In such an embodiment, each geometry accelerator 120 is allocated two bits in the GA availability register 306. Furthermore, in accordance with one preferred embodiment of the present invention, there are up to 16 geometry accelerators 120 in the system 100. Accordingly, in the illustrative embodiment shown in FIG. 3, the GA availability register 306 contains 32 bits representing the status of the 16 geometry accelerators 120. One example of the processing capabilities that may be represented by the four availability status levels in this embodiment is discussed below.

The four availability status levels are referred to as Completely Available, Substantially Available, Partially Available and Unavailable. A Completely Available status indicates that the geometry accelerator is capable of immediately processing vertex data. A Substantially Available status indicates that there may be a brief wait before the geometry accelerator will be capable of processing new vertex data. A Partially Available status indicates that there will be a moderate wait before the geometry accelerator will be capable of processing vertex data. An Unavailable status indicates that there will be a significant wait before the geometry accelerator will be capable of processing vertex data.

The availability status may be determined based upon one or more characteristics of the geometry accelerator that are indicative of its ability to receive and process vertex data. In one preferred embodiment, the Completely Available status indicates that the geometry accelerator has no data in its input or output FIFOs and is not currently processing any vertex data. The Substantially Available status indicates that the geometry accelerator has no data in its input FIFO and is not currently processing any vertex data. However, the geometry accelerator does have data in its output FIFO. The Partially Available status indicates that the geometry accelerator has no data in its input FIFO and is currently processing vertex data. Finally, the Unavailable status indicates that the geometry accelerator input FIFO has at least some data waiting to be processed, and the geometry accelerator is currently processing vertex data. As one skilled in the relevant art would find apparent, additional or different characteristics of the geometry accelerator may be considered in determining each of the above or other availability status levels.

In the illustrative embodiment, the availability status bits are provided directly to the distributor through lines 152 by the geometry accelerators 120. However, the geometry accelerators 120 reside in a different clock domain. To maintain timing between the distributor 118 and geometry accelerators 120, well-known synchronizing timing techniques are preferably used. In such an arrangement, the distributor 118 provides a clock with the chunks of vertex data to the geometry accelerators 120. The geometry accelerator 120 that receives the chunk of vertex data recovers the clocking as well, enabling the geometry accelerators 120 and distributor 118 to maintain bit synchronization. However, to prevent the distributor 118 from significantly misinterpreting the availability bits due to the lack of synchronization between the geometry accelerators 120 and distributor 118, the availability status bits are preferably Gray code encoded.

Thus, in the embodiment wherein there are four availability status levels represented by 2 bits, the Completely Available status is assigned a bit pattern 10 base 2; the Substantially Available status is assigned a bit pattern 11 base 2; the Partially Available status is assigned a bit pattern of 01 base 2; and the Unavailable status is assigned a bit pattern of 00 base 2. In this manner, transitioning to an adjacent availability status level requires only one bit value to be changed. As shown in FIG. 3, the Gray code representation of status of geometry accelerator 0 is represented by bits 0 (LSB) and 1 (MSB), the status of geometry accelerator 1 is represented by bits 2 (LSB) and 3 (MSB), and so on. It is understood, however, that other encoding schemes may be used to protect against lack of synchronization between the distributor 118 and geometry accelerators 120. For example, the Availability status bits may be Johnson code encoded.

After each chunk of vertex data generated by the state controller 202 is transmitted over input bus 126, the state controller 202 globally transmits one or more GA control words which are sensed by all of the geometry accelerators 120 in the system 100. The geometry accelerators 120 utilize the GA control words in a manner described below to determine which geometry accelerator 120 has been selected by the distributor 118 to be the geometry accelerator to receive the next chunk of vertex data; that is, which will be the next "current geometry accelerator".

A simplified block diagram of one embodiment of a geometry accelerator 120 of the present invention is shown in FIG. 4. In accordance with the present invention, the plurality of geometry accelerators 120 and the distributor 118 are connected through two unidirectional buses that transmit data in opposite directions: the contiguous input bus 126 and the non-contiguous output bus 128. The geometry accelerators 120 are connected directly to the input bus 126 through appropriate interfacing hardware. A transmission from the distributor 118 propagates the length of the input bus 126 to be made available to all of the geometry accelerators 120. In accordance with the present invention, each geometry accelerator 120 includes a controller 402 that is connected to the input bus 126 through input buffer 404 and a bus monitor line 436 to enable each geometry accelerator 120 to sense all passing bus traffic, enabling it to monitor the condition of the bus so that it may selectively receive data.

The geometry accelerators 120 are also coupled to the output bus 128 in a manner that enables them to control the flow of data generated by upstream geometry accelerators. The output bus 128 begins at the last geometry accelerator 120P and is multiplexed through each intermediate geometry accelerator 120, terminating at distributor 118. The controller 402 is also coupled to the output bus 128 through output buffer 406 and bus monitor line 438. The input and output buffers 404, 406 are preferably FIFOs. This dual bus arrangement enables the distributor 118 to control the allocation of vertex data while enabling the geometry accelerators 120 to control the subsequent combining of resulting rendering data to insure that the chunks of rendering data are received by the distributor in the proper sequence. In the illustrative embodiment shown in FIG. 4, the geometry accelerator 120 is coupled to the output bus 128 through a multiplexer 442. However, as one skilled in the relevant art would find apparent, the geometry accelerator may be connected to the output bus 128 through any means that enables the controller 402 to control the flow of data through the geometry accelerator 120.

The controller 402 receives two hold-off control lines 441 and 443 associated with the input and output buses, respectively. The controller 402 also drives two hold-off control lines 448 and 446, also associated with the input and output buses, respectively. The input bus hold-off control line 441 is associated with the downstream side of the input bus 126 and is driven by the controller 402 in the downstream geometry accelerator to indicate whether additional data can be received. The controller 402 drives the input bus hold-off control line 446 to indicate to the upstream geometry accelerators whether additional data can be received. The output bus hold-off control line 442 is associated with the downstream side of the output bus 128 and is driven by the controller 402 in the downstream geometry accelerator to indicate whether additional data can be received. The controller 402 drives the output bus hold-off control line 448 to indicate to the upstream geometry accelerators whether additional data can be received.

The controller 402 drives the output lines 446 and 448 as necessary to stop the stream of data should that become necessary because either its own FIFOs or that of downstream geometry accelerators are full. The latter condition is provided to the geometry accelerator through the input lines 440 and 442.

The geometry accelerator 120 also includes state registers 410 configured in accordance with the present invention. State registers 410 preferably include a system configuration register 412, a current loading GA register 413 and a current unloading GA register 414. The configuration register 412 is analogous to the configuration register 302 of distributor 118. Configuration register 412 includes a 4-bit value representing the number of geometry accelerators 120 present in the system 100. The current loading GA register 413 is analogous to current loading GA register 304 of distributor 118. The current loading GA register 413 contains a 4-bit geometry accelerator ID (GA ID) value representing the current geometry accelerator which is presently receiving a chunk of vertex data from the distributor 118 (the "current geometry accelerator"). The current unloading GA register 414 contains a 4-bit value representing the current geometry accelerator which is to output its chunk of rendering data in output buffer 406 onto output bus 128.

The geometry accelerator 120 also includes a GA processing unit 408 that performs well-known geometry accelerator functions including, for example, transformations, decomposition of quadrilaterals, partial slope calculations for triangles and vectors, lighting (or shading), clipping, and plane equation (or slope) calculations of randomly-oriented and defined quadrilaterals, triangles and vectors. The resulting rendering data is written to output buffer 406 and is subsequently supplied to the frame buffer subsystem 106 for rendering into pixel data and to texture-mapping subsystem 104 (if present) for generation of per-pixel texture color values.

As shown in FIG. 4, the controller 402, input and output buffers 404 and 406, state registers 410 and GA processing unit 408 communicate via bus 416. However, as one skilled in the relevant art would find apparent, geometry accelerator 120 may have other architectural configurations.

As noted above, in the illustrative embodiment, the geometry accelerators 120 provide their availability status 430 to the distributor 118 over communication lines 152. In the above embodiment wherein there are four availability levels, the geometry accelerators 120 include 2 pins 432 and 434 to identify the appropriate status level.

In addition, input lines are provided to the GA ID value which uniquely identifies each geometry accelerator 120 in the system 100. In the embodiment in which there are 16 geometry accelerators, each geometry accelerator 120 includes four ID lines 422, 424, 426 and 428 that are wired in different patterns to indicate the GA identification value. When each geometry accelerator is mounted in the graphics system 100, the pins are connected to a high or low voltage source to indicate the GA ID value assigned to that geometry accelerator. The distributor 118 knows the GA ID value of each of the geometry accelerators 120 by virtue of the geometry accelerator's location in the system 100. In the illustrative embodiment shown in FIG. 1, the geometry accelerator 120 closest to the distributor 118 is assigned a GA ID of 0 (pattern 0000), with the remaining geometry accelerators wired in sequential order to GA ID 15 (pattern 1111). Other GA ID assignments may also be used. Each geometry accelerator 120 also includes a pin 429 that is used to identify which geometry accelerator is the last geometry accelerator on the input and output buses 126, 128. In the illustrative embodiment, pin 429 in the geometry accelerator 120P, having a GA ID of 15, is tied high (connected to a high voltage source) while pin 429 is tied low in all other geometry accelerators.

The distributor 118 automatically determines the physical number of geometry accelerators 120 present in the system 100 on power-up reset. As noted, this number is stored in the configuration registers 302 and 412. To limit the number of dedicated lines between the distributor 118 and the geometry accelerators 120, the Availability status lines 432 and 434 are preferably used to provide the means for enabling the distributor 118 to make this determination.

Specifically, the 2-bit Availability status is Gray coded and is set to indicate that the geometry accelerator is Completely Available (10 base 2) after a power reset. The Availability status lines 432, 434 are pulled down to a low voltage source. Therefore, the Availability status bits for the geometry accelerators that are not present will be set to 00 base 2 during reset. This enables the distributor 118 to determine how many geometry accelerators are present during reset simply by examining the high order Availability status bit for each of the geometry accelerators. Once reset is complete and before data is presented to the graphics system 100, the Availability status lines 432, 434 return to their normal programming mode of representing the current capability of the geometry accelerators to process vertex data.

As noted, the distributor 118 provides the geometry accelerators 120 with the number of geometry accelerators in the system 100 via input bus 126. This value is globally transmitted to all geometry accelerators 120 once the distributor 118 receives and processes the Availability status bits during reset. Upon receipt, the controller 402 stores the value in the configuration register 412 for use in determining the current loading GA value which is stored in register 413, and the current unloading GA value which is stored in register 414.

The current loading geometry accelerator ID value stored in register 413 is a value that is initialized by controller 402 upon system power reset to a predetermined value, and is the same initialized value for the distributor 118 and all geometry accelerators 120 in the system 100. The controller 402 monitors input bus 126 through monitor lines 436 and uses the GA control words appearing on input bus 126 to determine whether or not data on the input bus 126 should be written into input FIFO buffer 404. This can be either because the decoded data is seen as global data intended for all geometry accelerators or because there is a match between the current loading GA ID value in register 413 and the GA ID lines 420 of that geometry accelerator.

The controller 402 increments the current loading GA ID value upon sensing each GA control word transmitted by distributor 118 over input bus 126. When the value stored in register 413 is equal to the GA ID of the geometry accelerator 120, then that geometry accelerator 120 is the current geometry accelerator. When this occurs, the controller 402 of that geometry accelerator accepts and processes the next chunk of vertex data generated by distributor 118.

Each of the GA control words generated by the distributor 118 is received by all geometry accelerators. The selected current geometry accelerator receives the chunk of vertex data with the GA control word. The distributor 118 transmits no vertex data with the GA control word to geometry accelerators that are determined to be too busy to process data, advancing past these geometry accelerators until the selected current geometry accelerator is reached.

When the current GA ID stored in the register 413 reaches the value of the number of geometry accelerators in the system 100 stored in register 412, the controller 402 resets the current GA register 413 to its initial value. This same approach is performed by distributor 118 with respect to register 304. In other words, the GA ID values are continually repeated in a predictable sequence. This enables the distributor 118 and all geometry accelerators 120 in the system 100 to synchronously maintain the same GA ID value in their respective current loading GA register 413.

Preferably, the distributor 118 determines the current geometry accelerator based upon the following decision criteria. It should be understood that additional or different criteria may be used based upon the particular application. First, as noted, the geometry accelerator indicating the greatest availability is selected as the current geometry accelerator. Should the presently current geometry accelerator and another geometry accelerator have the same availability status, the geometry accelerator that is not the presently current geometry accelerator is chosen to be the next current geometry accelerator. This approach has been found to be the most efficient when two geometry accelerators that include the current geometry accelerator indicate the same level of availability because the last geometry accelerator to have received a chunk of vertex data is statistically less available than other geometry accelerators having the same availability status. This is because data in transit between FIFO 210 and interface 212 are not taken into consideration in the determination of the Availability status.

When two or more geometry accelerators have the same availability status, and neither is the current geometry accelerator, then the state controller 202 preferably selects the geometry accelerator which is physically closest to the presently current geometry accelerator to minimize the number of GA control words that are required to be transmitted. For similar reasons, if all of the geometry accelerators in the system, including the presently current geometry accelerator, have the same availability status, the distributor 118 transmits a single GA control word, making the geometry accelerator adjacent to the current geometry accelerator the next geometry accelerator to receive a chunk of vertex data.

As noted, the geometry accelerators generate rendering data resulting from the processing of vertex data representative of graphics primitives. In accordance with the present invention, the geometry accelerators generate corresponding chunks of rendering data, and output them onto the output bus 128 in the same sequence that the corresponding chunks of vertex data were distributed.

Initially, the geometry accelerators 120 place the chunks of rendering data into the output FIFO buffer 406 with the GA control word that the geometry accelerator received with the associated chunk of vertex data. Each output FIFO buffer 406 is coupled to the output bus through the multiplexer 442 that enables the geometry accelerator to forward to the distributor either rendering data provided by upstream geometry accelerators or rendering data in its own output buffer 406.

The controller 402 determines when to output the data in the output FIFO 406 onto the output bus 128 such that the original order is restored. When a geometry accelerator 120 forwards a chunk of rendering data to the distributor 118, it also forwards the associated GA control word. The geometry accelerator controllers 402 monitor the output bus 128 through the bus monitor lines 438 to determine when to interrupt the flow of data from the upstream geometry accelerators and output its rendering data stored in output buffer 406 onto the output bus 128.

The controller 402 counts the number of GA control words that appear on output bus 128 to determine which upstream geometry accelerator is currently transmitting a chunk of rendering data. The controller 402 increment the current unloading GA register 414 with each GA control word that appear on output bus 128. When the value stored in the register 414 indicates that the geometry accelerator is the next in sequence to output its chunk of rendering data, the controller 402 of that geometry accelerator stops the flow of data to the distributor 118 from upstream geometry accelerators and outputs the chunk of rendering data stored in the output FIFO buffer 406 to the output bus 128.

The controller 402 controls a multiplexer 442 through control line 440. The multiplexer 442 has two inputs: output bus 128 from the upstream geometry accelerators (if any) and the output of the output buffer 406. The controller 402 insures that chunks of rendering data in the output buffer 406 are placed onto the output bus 128 at the proper time by allowing only the output of the output buffer 406 to pass through the multiplexer 442 at the proper time. This insures that the distributor 118 receives a single stream of rendering data that has chunks of rendering data ordered in the same sequence as the chunks of vertex data provided to the geometry accelerators 120.

Referring again to FIGS. 1 and 2, the distributor 118 receives the stream of rendering data from the geometry accelerators 120. The distributor 118 includes an interface module 222 that interfaces with the first geometry accelerator 120A and transfers the chunks of rendering data to a FIFO 224. A reformatter 226 formats the stream of rendering data as necessary for the texture subsystem 104 and the frame buffer subsystem 106, performs a floating point to fixed point conversion, and provides them to an output FIFO 228. The stream of rendering data is then provided to the frame buffer subsystem 106, possibly through the texture subsystem 104.

Those skilled in this art will understand that the functions provided by controllers 202 and 402 may be performed by software or firmware executing on a general-purpose or a special purpose processor, or could be performed by hardware configured for the purpose, or a combination of these techniques, as may be useful for a particular application.

A flow chart of the dynamic chunk allocation method of the present invention performed by the distributor 118 and the geometry accelerators 120 of the present invention is provided in FIG. 5A. After a system power reset, system processing advances to block 502 where the current loading GA register 413 and current unloading GA register 414 of each of the geometry accelerators 120 are initialized by the respective controller 402 with a predetermined GA ID value. Likewise, the current loading GA register 304 in the distributor 118 is initialized with the same value as the current loading GA registers 413.

At block 502 the distributor state controller 202 also determines the number of geometry accelerators 120 in the system 100 based upon the information provided it through the availability status lines during system reset. Once determined, the state controller 202 initializes the configuration register 302 with this value and globally provides this value to all of the geometry accelerators 120 in the system 100 over input bus 126. The controller 402 of each of the geometry accelerators 120 receives this value and initializes its respective configuration register 412 with this same value. Thus, the distributor 118 and geometry accelerators 120 are aware of the number of geometry accelerators 120 in the graphics system 100.

At block 504 each of the geometry accelerators 120 provides the distributor 118 with its availability status information 430. As noted, this information is provided to the distributor 118 over communication lines 152. Distributor 118 receives this availability status information, and stores these values in GA availability register 306.

At block 506, the distributor 118 determines the current geometry accelerator; that is, the geometry accelerator 120 to receive the next chunk of vertex data. As noted, the distributor 118 makes this determination based upon the current availability of each of the geometry accelerators 120. When making this determination, the controller 202 accesses the GA availability register 306 and selects the geometry accelerator that is the most available to process vertex data in accordance with the above-noted selection criteria.

Once the distributor 118 determines the next geometry accelerator which is to receive the next chunk of vertex data, it updates the current GA register 304 with the GA ID of the selected geometry accelerator at block 508. The distributor 118 also globally transmits the necessary number of GA control words over input bus 126 in order to have the geometry accelerators increment the GA ID value contained in their respective registers 413 to arrive at the GA ID value of the selected current geometry accelerator.

As noted, each geometry accelerator 120 increments the GA ID value contained in its current loading GA register 413 by the number of GA control words it has detected on input bus 126. In other words, each time a GA control word is sent by the distributor 118, the geometry accelerators increment the current loading GA value by one. When the GA ID value is the highest number GA enabled in the system 100, then the current GA ID value is recycled to the initial GA ID value.

The distributor 118 transmits, at block 510, the current chunk of vertex data to the geometry accelerator 120 having the GA ID currently stored in the current GA register 304.

As noted, this is the same GA ID value currently stored in registers 414 in each of the geometry accelerators 120.

At block 512, the controller 402 of each of the geometry accelerators 120 compares the current GA ID value in the current loading GA register 413 with its unique ID value to determine if it has been selected to be the current geometry accelerator. Each GA control word will be received by each successive geometry accelerator and the current geometry accelerator will receive a GA control word and the next chunk of vertex data.

This process is repeated until all chunks of vertex data have been processed by the geometry accelerators 120 as determined at block 514.

Figure 5B:
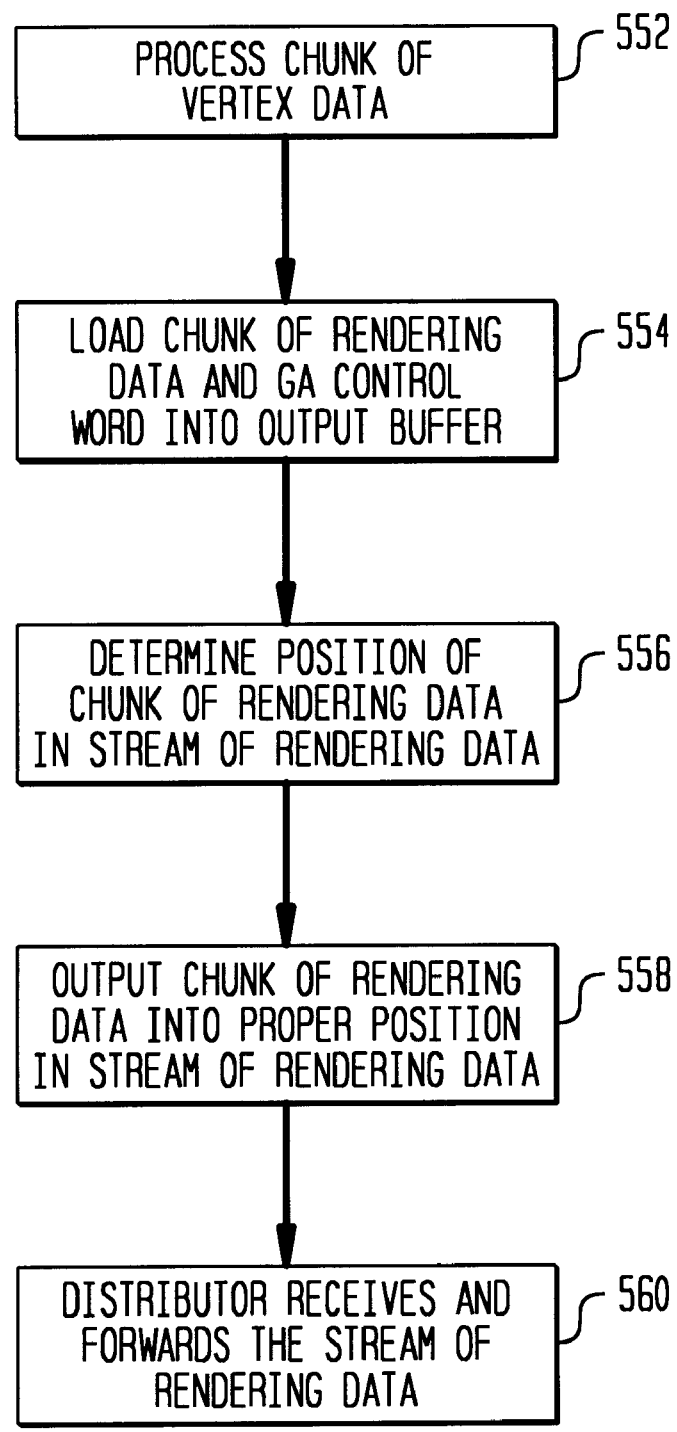
FIG. 5B is a flow chart of the functions performed by the distributor and geometric accelerators during the combining of chunks of rendering data.

FIG. 5B illustrates the process performed by each geometry accelerator 120 to output chunks of rendering data in the proper sequence. At block 552, the geometry accelerator 120 processes the chunk of vertex data that it received on input bus 126. The resulting chunk of rendering data and a GA control word are loaded into the output buffer 406 at block 554.

At block 556 the geometry accelerator 120 determines when to output its chunk of resulting rendering data onto the output bus 128. Knowing its unique GA ID and the point in the sequence in which that geometry accelerator received a chunk of vertex data, each geometry accelerator knows where in the stream of resulting rendering data its chunk of rendering data is to be located. By monitoring the output bus 128 via monitor lines 438, the geometry accelerator counts the GA control words released by upstream geometry accelerators. Through the control of multiplexer 442, the controller 402 forwards the chunks of rendering data generated by upstream geometry accelerators that are to be positioned before the chunk of rendering data presently stored in this geometry accelerator's output buffer 406. The controller 402 then stops the flow of data from upstream geometry accelerators and outputs its chunk of rendering data and the associated GA control word. Afterwards, the geometry accelerator allows the remaining chunks of rendering data generated by the upstream geometry accelerators, if any, to flow through its multiplexer 442.

At block 560 the distributor 118 receives a stream of rendering data representing a sequence of graphics primitives that is in the same order as the stream of graphics primitives represented by the stream of vertex data.

In a preferred embodiment of the present invention, dynamic chunk allocation is performed by the distributor 118 and the geometry accelerators 120. However, other configurations may be implemented. For example, the distributor 118 may be configured to have sole control over the dynamic chunk allocation method of the present invention. In such an arrangement the geometry accelerators 120 may be identified according to addresses on input bus 126. The distributor 118 can include such an address in the chunk of vertex data, so that only a selected geometry accelerator receives and processes the data. This relieves the geometry accelerators from having to maintain the configuration and current loading GA registers. Also, in one preferred embodiment, two geometry accelerators are included in a single integrated circuit. Accordingly, in the illustrative embodiment shown in FIG. 1, eight such ICs would be implemented to provide the 16 geometry accelerators 120.

In order to increase the performance of system 100 and reduce the geometry accelerator idle time, a number of optimizations may be made in the design of system 100. For example, the depth of the input FIFO buffer 404 and the output FIFO buffer 406 are preferably of sufficient depth to hold an entire chunk of vertex and rendering data, respectively. Should there be insufficient room in the FIFO buffers for an entire chunk, the system 100 will cease processing the vertex data while it waits for room to become available in that FIFO buffer before data is transmitted to any other geometry accelerator. The size of the FIFO buffers 404 and 406 must be balanced with the available space in the integrated circuit in which the geometry accelerators 120 are implemented as well as the cost of larger FIFO buffers.

Another consideration is the number of vertices per chunk of vertex data that is transmitted by distributor 118. This consideration is related to the FIFO depth size in that the number of vertices which are provided to a geometry accelerator in a single chunk of vertex data must not be so great as to overflow the FIFO buffer, causing the above-noted delays in the system 100. In addition, the size of the chunks and the FIFO size also affect the time from when the distributor 118 outputs a chunk of vertex data to when the distributor 118 receives back the availability status from the geometry accelerators 120. If the delay is too long relative to the time it takes the distributor 118 to transmit a chunk of vertex data, then the distributor 118 may base its determination of the next current geometry accelerator on dated information. In determining the vertices per chunk, the manner in which the application transfers to chunks of data to the application program interface (API) should also be considered.

Another consideration in optimizing the system 100 is the number of availability levels that are used to represent the processing capability of the geometry accelerators. Although a larger number of availability status levels will provide further insight into the processing capabilities of the geometry accelerators, the additional availability status levels require correspondingly additional bits per geometry accelerator. For example, for system 100 to support eight availability status levels, each of the geometry accelerators 120 must have three bits to represent the eight levels. In the illustrated embodiment wherein the system 100 has sixteen geometry accelerators, there would be a total of 48 bits that the distributor 118 must process in order to determine the next current geometry accelerator. In addition to possibly being too time consuming, there may not be 48 pins available on the integrated circuit on which the functionality of the distributor 118 is implemented to receive this number of availability status bits. In addition, increasing the size of the distributor 118 this number of availability status lines must be balanced with the significant associated cost increase.

Another consideration for optimizing system 100 is the determination of how the depth of the input and output FIFO buffers 404 and 406 are taken into consideration in defining the availability status levels. That is, how much data is to be in each of the FIFOs for that condition to be considered pertinent to the availability status levels.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer graphics system comprising:

a plurality of geometry accelerators each configured to process vertex data representative of graphics primitives and to provide rendering data, each of said plurality of geometry accelerators generating availability status information indicating one of a plurality of levels of vertex data processing capability, wherein said plurality of levels represent a series of successively greater capability to process vertex data; and a distributor, responsive to a stream of vertex data, for dynamically allocating each of said chunks of said vertex data to one of said plurality of geometry accelerators to provide a corresponding chunk of rendering data, wherein said allocation is based upon a relative capability of said plurality of geometry accelerators to process said chunks of vertex data, said relative processing capability identified by said availability status information provided by said plurality of geometry accelerators.

2. The system of claim 1, wherein said plurality of geometry accelerators and said distributor are connected through two unidirectional buses that transmit data in opposite directions, said buses comprising:

an input bus connected to said plurality of geometry accelerators and to said distributor such that a transmission from said distributor propagates the length of said input bus and is made available to all of said plurality of geometry accelerators; and an output bus connected to said plurality of geometry accelerators such that each of said geometry accelerators controls the flow of data generated by upstream geometry accelerators.

3. The system of claim 2, wherein said plurality of geometry accelerators generate chunks of rendering data corresponding to said chunks of vertex data and wherein said plurality of geometry accelerators each output said chunks of rendering data onto said output bus such that said chunks of rendering data appear in a stream of rendering data having a same sequence that said corresponding chunks of vertex data were allocated by said distributor.

4. The system of claim 3, wherein each of said plurality of geometry accelerators comprises:

an input buffer;

an output buffer;

a processing unit for performing geometry accelerator functions; and a controller for controlling said input buffer, said output buffer and said processing unit.

5. The system of claim 4, wherein said controller controls said input buffer, said output buffer and said processing unit based on factors comprising:

an amount of vertex data in said input buffer, an amount of rendering data in said output buffer, and whether vertex data is currently being processed by said processing unit.

6. The system of claim 4, wherein said plurality of levels of vertex data processing capability comprise:

a completely available status indicating that a corresponding geometry accelerator can immediately process vertex data; and an unavailable status indicating that there will be a significant wait before said corresponding geometry accelerator can process vertex data.

7. The system of claim 6, wherein said completely available status indicates that said corresponding geometry accelerator has no data in said input and said output buffers and is not currently processing vertex data.

8. The system of claim 6, wherein said unavailable status indicates that said corresponding geometry accelerator has an input buffer that is at least partially full and said corresponding geometry accelerator is currently processing vertex data.

9. The system of claim 6, wherein said plurality of levels of vertex data processing capability further comprises:

a substantially available status indicating that a momentary wait will occur before said corresponding geometry accelerator will be capable of processing vertex data; and a partially available status indicating that a moderate wait will occur before said corresponding geometry accelerator processes vertex data.

10. The system of claim 9, wherein said substantially available status indicates that said corresponding geometry accelerator has no data in said input buffer, is not currently processing vertex data, but has data in said output buffer.

11. The system of claim 9, wherein said partially available status indicates that said corresponding geometry accelerator has no data in said input buffer and is currently processing vertex data.

12. The system of claim 4, wherein said outputting means comprises:

a multiplexer having a first input coupled to said output buffer and a second input coupled to said output bus from upstream geometry accelerators and an output coupled to said output bus toward said distributor; and means for controlling said multiplexer such that rendering data in said output buffer and rendering data provided by said upstream geometry accelerators are provided to said distributor in said same sequence that said corresponding chunks of vertex data were distributed by said distributor.

13. The system of claim 1, wherein said distributor further comprises:

means for generating one or more GA control words to identify to each of said plurality of geometry accelerators which geometry accelerator has been determined to receive a chunk of vertex data, and wherein each of said plurality of geometry accelerators comprises:

means for sensing said one or more GA control words on said input bus, and means for determining said selected geometry accelerator based upon said one or more GA control words.

14. The system of claim 1, wherein said distributor comprises:

a state controller constructed and arranged to determine a current geometry accelerator to receive and process each chunk of vertex data based upon said relative availability of all of said plurality of geometry accelerators.

15. The system of claim 14, wherein said distributor further comprises:

a system configuration register for defining a number of said plurality of geometry accelerators in the system; and a current loading geometry accelerator register for defining which of said plurality of geometry accelerators is currently designated to receive a chunk of vertex data.

16. The system of claim 15, wherein each of said plurality of geometry accelerators comprises:

a system configuration register for defining a number of said plurality of geometry accelerators in the system; and a current loading geometry accelerator register for defining which of said plurality of geometry accelerators is currently designated to receive a chunk of vertex data.

17. A method for processing vertex data in a computer graphics system, comprising the steps of:
   a) generating an availability status at each of a plurality of geometry accelerators, said availability status indicating a capability of a corresponding geometry accelerator to process a chunk of vertex data, said plurality of levels of vertex data processing capability representative of successively greater capability to process vertex data;
   b) selecting, by a distributor connected to said plurality of geometry accelerators, one of said plurality of geometry accelerators to provide with a chunk of said vertex data based upon said availability status provided by each of said plurality of geometry accelerators;
   c) distributing chunks of vertex data representative of graphics primitives to said selected geometry accelerator over a bus connecting said plurality of geometry accelerators and said distributor; and
   d) processing, by said plurality of geometry accelerators, said chunks of vertex data to provide chunks of rendering data.

18. The method of claim 17, further comprising the step of:
   e) selectively outputting, by said geometry accelerators, said chunks of rendering data on an output bus connected to said plurality of geometry accelerators and said distributor.

19. The method of claim 18, further comprising the step of:
   f) controlling, by each said geometry accelerator, flow of said chunks of rendering data generated by upstream geometry accelerators to provide a stream of rendering data wherein said stream of rendering data and said stream of vertex data represent sequences of graphics primitives having the same order.

20. The method of claim 17, wherein said step a) comprises the step of:
   1) generating, by each of said plurality of geometry accelerators, said availability status information based upon characteristics indicative of said geometry accelerator's ability to receive, process and output data.

21. The method of claim 20, wherein said plurality of levels of vertex data comprise:
   a completely available status indicating that a corresponding geometry accelerator can immediately process vertex data; and
   an unavailable status indicating that there will be a significant wait before said corresponding geometry accelerator can process vertex data.

22. The method of claim 21, wherein said completely available status indicates that said corresponding geometry accelerator has no data in said input and said output buffers and is not currently processing vertex data.

23. The method of claim 21, wherein said unavailable status indicates that said corresponding geometry accelerator has an input buffer that is at least partially full and said corresponding geometry accelerator is currently processing vertex data.

24. The method of claim 23, wherein said substantially available status indicates that said corresponding geometry accelerator has no data in said input buffer, is not currently processing vertex data, but has data in said output buffer.

25. The method of claim 21, wherein said plurality of levels of vertex data processing capability further comprises:
   a substantially available status indicating that a momentary wait will occur before said corresponding geometry accelerator will be capable of processing vertex data; and
   a partially available status indicating that a moderate wait will occur before said corresponding geometry accelerator processes vertex data.

26. The method of claim 25, wherein said partially available status indicates that said corresponding geometry accelerator has no data in said input buffer and is currently processing vertex data.

27. The method of claim 17, wherein said step c) comprises the steps of:
   1) generating one or more GA control words to identify to each of said plurality of geometry accelerators which geometry accelerator has been determined to receive a chunk of vertex data;
   2) sensing, by each of said plurality of geometry accelerators, said one or more GA control words on said input bus; and
   3) determining, by said plurality of geometry accelerators said selected geometry accelerator based upon said one or more GA control words.

28. A computer graphics system comprising:
   a plurality of geometry accelerators each configured to process vertex data representative of graphics primitives and to provide rendering data, each of said plurality of geometry accelerators generating availability status information indicating one of a plurality of levels of vertex data processing capability; and
   a distributor, responsive to a stream of vertex data, for dynamically allocating chunks of said vertex data to said plurality of geometry accelerators to provide corresponding chunks of rendering data, wherein said allocation is based upon a relative capability of said plurality of geometry accelerators to process each of said chunks of vertex data, said relative processing capability identified by said availability status information provided by said plurality of geometry accelerators,
   an input bus connected to said plurality of geometry accelerators and to said distributor such that a transmission from said distributor is made available to all of said plurality of geometry accelerators; and
   an output bus connected to said plurality of geometry accelerators such that each of said geometry accelerators controls the flow of data generated by upstream geometry accelerators.

29. The system of claim 28, wherein each of said plurality of geometry accelerators comprises:
   an input buffer constructed and arranged to receive chuinks of vertex data;
   a processing unit for generating chunks of rendering data corresponding to said chunks of vertex data;
   an output buffer for storing said generated chunks of rendering data;
   a controller for controlling said input buffer, said output buffer and said processing unit; and
   means for outputting from said output buffer said chunks of rendering data onto said output bus so as to provide a stream of rendering data having a sequene that is the same as a sequence in which said corresponding chunks of vertex data were allocated by said distributor.

30. The system of claim 29, wherein each of said plurality of geometry accelerators generates said availability status information based upon characteristics indicative of said geometry accelerator's ability to process data.

31. A computer graphics system comprising:
   a plurality of geometry accelerators each configured to process vertex data representative of graphics primitives and to provide rendering data, each of said plurality of geometry accelerators generating an availability indicator indicative of one of a plurality of successive capabilities to process vertex data; and a distributor, responsive to a stream of vertex data, for dynamically allocating each of a series of chunks of said vertex data to one of said plurality of geometry accelerators based on a relative capability of said plurality of geometry accelerators to process said chunks of vertex data, said relative processing capability determined based upon said availability indicators provided by said plurality of geometry accelerators, said distributor including, a register for storing a value identifying which of said plurality of geometry accelerators is currently designated to receive a chunk of vertex data; and a state controller constructed and arranged to determine a current geometry accelerator to receive and process each chunk of vertex data based upon said relative availability of all of said plurality of geometry accelerators.

32. The system of claim 31, wherein said plurality of geometry accelerators and said distributor are connected through two unidirectional buses that transmit data in opposite directions, said buses comprising:

an input bus connected to said plurality of geometry accelerators and to said distributor such that a transmission from said distributor propagates the length of said input bus and is made available to all of said plurality of geometry accelerators; and an output bus connected to said plurality of geometry accelerators such that each of said geometry accelerators controls the flow of data generated by upstream geometry accelerators.

33. The system of claim 32, wherein each of said plurality of geometry accelerators comprises:

a system configuration register for defining a number of said plurality of geometry accelerators in the system; and a current loading geometry accelerator register for defining which of said plurality of geometry accelerators is currently designated to receive a chunk of vertex data.

34. The system of claim 33, wherein said distributor further comprises:

means for generating one or more GA control words to identify to each of said plurality of geometry accelerators which geometry accelerator has been determined to receive a chunk of vertex data, and wherein each of said plurality of geometry accelerators comprises:

means for sensing said one or more GA control words on said input bus, and means for determining said selected geometry accelerator based upon said one or more GA control words.

* * * * *